P. W. PETERSEN.
CONTAINER FOR COMESTIBLES.
APPLICATION FILED MAY 4, 1921.

1,388,296. Patented Aug. 23, 1921.

Witness:—
Geo. W. Hansen.

Inventor:
Paul W. Petersen
By Jones, Addington, Ames & Seibold
Attys.

UNITED STATES PATENT OFFICE.

PAUL W. PETERSEN, OF CHICAGO, ILLINOIS.

CONTAINER FOR COMESTIBLES.

1,388,296.

Specification of Letters Patent. Patented Aug. 23, 1921.

Application filed May 4, 1921. Serial No. 466,631.

*To all whom it may concern:*

Be it known that I, PAUL W. PETERSEN, a citizen of the United States, residing at Chicago, in the county of Cook and State of Illinois, have invented new and useful Improvements in Containers for Comestibles, of which the following is a full, clear, concise, and exact description, reference being had to the accompanying drawing, forming a part of this specification.

My invention relates to containers for comestibles and it has special reference to devices that may be utilized in freezing or chilling comestibles, such as fish, whereby the comestibles may be expeditiously handled and refrigerated with the assurance that they will not be injured. Moreover, the comestibles or fish when placed in the container of my present invention are afforded protection against mechanical injury and, at the same time, are permitted to come in direct contact with the refrigerant that is circulated freely about the separate articles held in the container. This condition is desirable so as to properly preserve the comestibles in order that they may retain substantially unimpaired the properties which they possess in their fresh and initial state.

The container of my present invention is designed particularly for use in the refrigerating apparatus disclosed in my co-pending patent application Serial No. 460,970, filed April 13, 1921 and entitled refrigerating apparatus. In the refrigerating apparatus of the above mentioned application, the comestibles, such as fish, which are to be chilled or frozen are packed in containers while the comestibles are in their fresh state. The containers are immersed in a refrigerant which is circulated in order to come into direct contact with the comestibles within the containers. During the handling of the comestibles and the placing of them in the containers, as well as during the time that they are being subjected to the refrigerating process, it is highly desirable to protect the comestibles, particularly fish, from mechanical injuries or blows which are liable to break or crack their outer skins. Every precaution should be taken to prevent the fish from being bruised or injured so as to eliminate the liability of the fish becoming discolored after they have been subjected to the preserving operation. Moreover, the containers in which the comestibles or fish are inserted should be so designed as to permit of the free circulation of the refrigerant in direct contact with the comestibles. In the refrigerating apparatus which I propose to use, the refrigerant is circulated in contact with the fish and transversely of their longitudinal length. After the fish have been frozen in these containers, the containers are removed from the apparatus and the fish, formed in a frozen mold or cake, are then removed from the containers and placed in their permanent packing which may be of any suitable character.

In order to accomplish the foregoing results, I have designed the container herein disclosed and for a better understanding of the nature of my invention reference may be had to the following description and the accompanying drawing; in which, Figure 1 is a plan view of a container embodying a form of my invention and in which a plurality of fish have been arranged in order to be frozen into a solid cake or mold;

Figure 1:
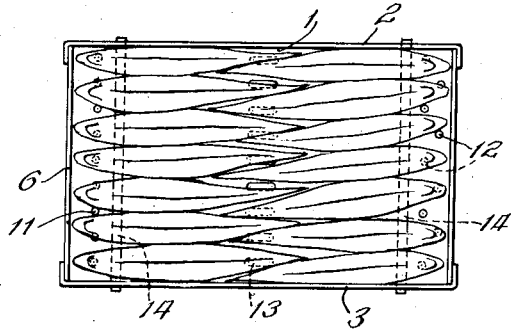
Figure 2:
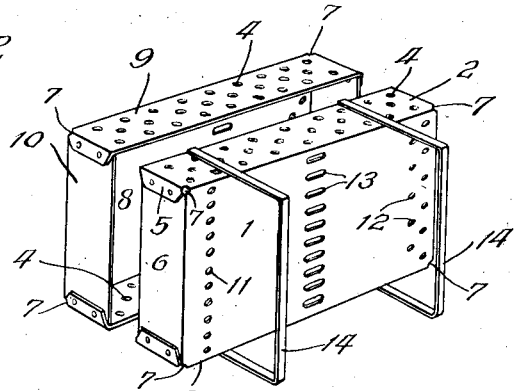
Fig. 2 is a perspective view of the container of Fig. 1.

Referring to Figs. 1 and 2, a box portion 1 of the container has its two longer sides, 2 and 3, provided with a plurality of perforations or openings 4 which permit the refrigerant to enter freely in the interior of the container. The openings 4 are not arranged in any special order but are preferably distributed uniformly in the sides 2 and 3 in order that a uniform and ample flow of refrigerant will be permitted transversely through the container. The ends of the sides 2 and 3 are provided with flaps 5 which overhang and are secured to the ends 6 of the box portion 1. The ends 6 are not perforated for the reason that it is not desired to permit the refrigerant to flow through the container longitudinally of the side members 2 and 3. The corners of the box member 1 are perforated as shown at 7. A cover 8, similar in structure to the box member 1, is provided therefor and its longer sides 9 are likewise provided with a series of perforations 4. The ends 10 of the cover 8 are likewise closed and unperforated. The cover 8 is so designed as to telescopically engage with the box member 1 in the usual fashion. The four corners of the cover 8 are likewise perforated as shown at 7.

In arranging the fish in the containers in order to refrigerate them, the fish are arranged in two side-by-side rows as shown in Fig. 1, the heads of the two rows of fish being placed immediately adjacent to the two closed ends 6 of the box 1. The fish are shown as gutted and are positioned with their backs in contact with the inner surface of the bottom of the box. The tails of the two rows of fish are consequently adjacent to one another. When the fish are packed in the box, it will be observed that open spaces are formed near the ends of the box as well as along the central portion thereof. The fish are packed tightly so that they are closely adjacent to each other along their body portions. In order to permit the fish to properly drain after being packed in the container, the bottom of the box member 1 is provided with a series of perforations 11 and 12 adjacent to the ends 6. In this fashion the open spaces adjacent to the heads of the two rows of fish are permitted to freely communicate with the outside in order to properly evacuate the container. The perforations may comprise a single row as shown at 11 or may be arranged as shown at 12. Similarly a series of perforations 13 are arranged along the center portion of the box member 1 and this permits of draining the open spaces formed in proximity to the tail portions of the two rows of fish. The perforations 13 may be of the form shown at 11 or 12 or may be in the form of elongated openings.

After the fish have been arranged as shown in Fig. 1 and the cover 8 and is applied to the box member 1, the container is then placed on edge as shown in Fig. 2, in which position it is held in the refrigerating apparatus. The refrigerant is permitted to flow, preferably by means of forced circulation, through the perforations 4 formed in the longer sides of the container. In this manner the refrigerant is forced to flow transversely of the longitudinal direction of the fish which I have found as being desirable in order to properly freeze the fish uniformly and in the shortest possible time. By reason of the perforations 11, 12 and 13 formed in both the box member 1 and the cover 8, any refrigerant tending to accumulate in the open spaces between the several fish will be permitted to flow freely from the container and after the fish have been frozen none of the refrigerant will be held in the container at the time that the frozen cake or mold is removed therefrom.

I have shown the box member 1 as being provided with two spaced U-shaped members 14 which serve to space the several containers from one another when they are placed in racks for immersing them in the refrigerant. The spacers 14 insure unimpeded circulation of the refrigerant between the separate and individual containers. The spacers 14 may be applied to the containers in any suitable fashion, but they should be so designed that they will afford as little opposition to the circulation of the refrigerant as is compatible with satisfactory refrigerating of the articles held within the containers.

Figure 3:
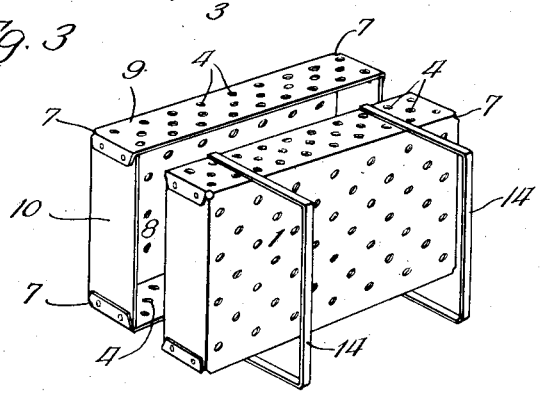
Fig. 3 is a perspective view showing a modified form of container.

In Fig. 3 I have shown a modified form of container but in this modification the bottom of the box member 1, as well as the top of the cover 8, are perforated throughout their entire areas, and this insures complete draining of the interior of the container.

Figure 4:
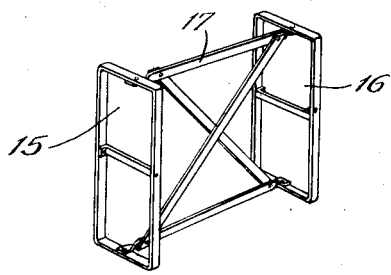
Fig. 4 is a spacer which may be used in conjunction with my containers when employed in connection with certain types of refrigerating apparatus.

The container of Fig. 3 is likewise provided with spacers 14 but it is obvious that these spacers may be dispensed with and the spacing between the several containers may be effected by means of the device shown in Fig. 4. The spacer of Fig. 4 is designed to be separate from the containers and comprises a frame work 15 and a frame work 16. The frame works 15 and 16 are placed in contact with the spaced containers and are held in spaced relation by means of a brace 17 which is formed of thin metal bars that are placed on end in order that the edges of the brace 17 may offer minimum opposition to the flow of the refrigerant between the frame works 15 and 16. Of course, it will be observed that when the device of Fig. 4 is employed the spacers 14 are not attached to the containers since the containers are held apart and spaced from one another by reason of the device of Fig. 4.

While I have shown several embodiments of my invention and have explained the mode of utilizing the same, it is to be understood that I do not desire to be limited to the specific structures shown and described for I expect that such limitations only will be placed upon my invention as are set forth in the appended claims.

Having thus described my invention what I now claim as new and desire to secure by Letters Patent, is:

1. A container for comestibles comprising a rectangular box member and a telescopic lid therefor, the ends of said box and of said lid being closed and the sides thereof being perforated to permit of a transverse flow of a refrigerant through the container.

2. A container for comestibles comprising a rectangular box member and a telescopic lid therefor, the members being closed at least on their ends in order to preclude a longitudinal flow of refrigerant through the container, but the other portions thereof being so perforated that transverse flow therethrough is permitted.

3. A container for comestibles comprising a rectangular box member and a telescopic lid therefor, the ends of said members being closed and the side, top and bottom surfaces being perforated to permit of the free egress of a refrigerant.

4. A container for comestibles comprising a rectangular box member and a telescopic lid therefor, the ends of said members being closed, the sides being uniformly perforated and the top and bottom surfaces being provided with spaced rows of perforations.

5. A container for comestibles comprising a rectangular box member and a telescopic lid therefor, the ends of said members being closed, the sides being uniformly perforated and the top and bottom surfaces being provided with spaced transverse rows of perforations.

6. A container for comestibles comprising a rectangular box member in which comestibles may be arranged longitudinally of said box member, and a telescopic lid for said box member, the ends of said members being sealed and the other surfaces thereof being perforated to limit the flow of refrigerant through the container in a direction transverse of the longitudinal direction of the comestibles contained therein.

7. A container for comestibles comprising a rectangular box member, a telescopic lid therefor, the ends of said members being sealed and the sides thereof being perforated, and means whereby said container may be retained in spaced relation from adjacent containers.

8. A container for comestibles comprising a rectangular box member in which comestibles may be arranged longitudinally of said box member, and a telescopic lid for said box member, the ends of said members being sealed and the other surfaces thereof being perforated to limit the flow of refrigerant through the container in a direction transverse of the longitudinal direction of the comestibles contained therein, and having spacer members extending therefrom to hold said container in predetermined spaced relation to other containers but opposing a minimum impediment to said flow of refrigerant.

9. A container for comestibles comprising a rectangular box member in which comestibles may be arranged longitudinally of said box member, and a telescopic lid for said box member, the ends of said members being sealed and the other surfaces thereof being perforated to limit the flow of refrigerant through the container in a direction transverse of the longitudinal direction of the comestibles contained therein and said box member having spacer members comprising a bracket-like structure extending beyond the lower edge thereof to hold said container in predetermined relation to other containers, said spacer structure being shaped and disposed to oppose a minimum impediment to said flow of refrigerant.

10. A container for comestibles comprising a rectangular box member in which comestibles may be arranged longitudinally of said box member, and a telescopic lid for said box member, the ends of said members being sealed and the other surfaces thereof being perforated to limit the flow of refrigerant through the container in a direction transverse of the longitudinal direction of the comestibles contained therein and to intensify said flow near the ends of said container.

11. A container for comestibles comprising a rectangular box member in which comestibles may be arranged longitudinally of said box member, and a telescopic lid for said box member, the ends of said members being sealed and the other surfaces thereof being perforated to a greater degree near the ends of said container than elsewhere to limit the flow of refrigerant through the container in a direction transverse of the longitudinal direction of the comestibles contained therein and to intensify said flow near the ends of said container.

In witness whereof, I have hereunto subscribed my name.

PAUL W. PETERSEN.

Witnesses:
GEO. W. HANSEN,
MABEL ZENDER.